3,193,729
ELECTRICAL RELAY SYSTEMS HAVING INVERSE TIME CHARACTERISTICS
Eric Paddison, Stafford, England, assignor to The English Electric Company Limited, London, England, a British company
Filed Aug. 28, 1961, Ser. No. 134,440
Claims priority, application Great Britain, Mar. 11, 1957, 7,918/57, Patent 882,436
6 Claims. (Cl. 317—36)

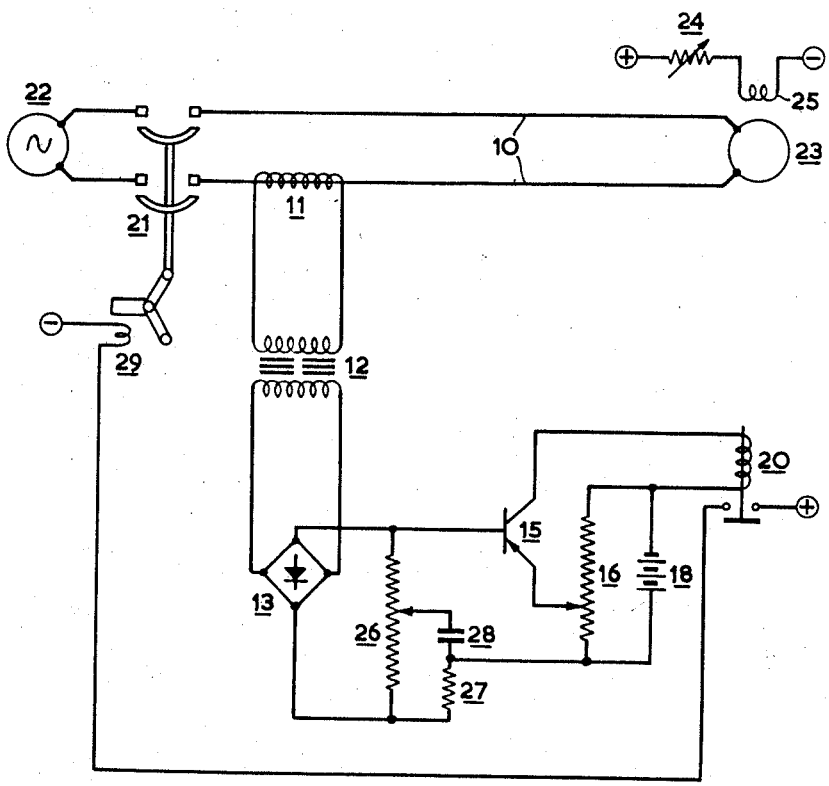

This application is a continuation-in-part of my application Serial 719,834, filed March 7, 1958, now abandoned.

The invention relates to electrical relay systems and to the protection of electric power transmission systems.

An object of the invention is to provide a relay system having a "very inverse" time lag characteristic; that is to say, one in which the time of response decreases (with increase of input signal) more rapidly than the reciprocal of the input signal strength decreases.

The single figure of the accompanying drawing is a circuit diagram of an arrangement embodying the invention in preferred form.

A single phase alternating current electric power transmission line 10 connects an alternator 22 through a circuit breaker 21 to a load shown as a synchronous motor 23. Means to vary the load, and hence the current in line 10, continuously over a range of values, are indicated by a variable resistor 24 in series with the field winding 25 of the synchronous motor, excited from a D.C. source.

A current transformer 11 in line 10 has a transactor 12 connected across its secondary winding. A transactor is a transformer having a large air gap in its iron core so that the output voltage across its secondary winding varies proportionally with the current in its primary winding.

A rectifier bridge 13 is connected across the secondary winding of transactor 12. A resistance potentiometer 26 is connected across the output of rectifier bridge 13.

A time-constant network consisting of resistor 27 in series with a capacitor 28 is connected from the positive end of potentiometer 26 to its tapping. Resistor 27 should preferably have high resistance value relative to that of potentiometer 26.

A transistor amplifier 15 is energized from a battery 18, across which a resistance potentiometer 16 is connected. The emitter of the transistor is connected to the tapping on this potentiometer. The coil of a relay 20 is connected as load in the collector circuit.

When the coil of relay 20 is energized, a circuit is completed from a D.C. source to trip coil 29 of circuit breaker 21.

When a sudden large increase of current occurs in line 10, due perhaps to a short-circuit on the line or a fault in the load, a correspondingly large increase occurs in the output voltage of rectifier 13 applied across potentiometer 26. The voltage across resistor 27 will initially rise suddenly in proportion, but it will then fall away exponentially as capacitor 28 becomes charged.

The base-emitter input circuit of transistor amplifier 15 is connected between the negative end of potentiometer 26 and the junction of resistor 27 and capacitor 28. The input voltage is therefore the difference between (a) the voltage across the whole of potentiometer 26 and (b) the voltage across resistor 27. The transistor amplifier is biased by the voltage across the bottom part of potentiometer 16. When the input voltage rises beyond the bias, the transistor becomes conductive and the relay 20 operates to trip the circuit breaker 21 to interrupt the current in line 10.

If the current in line 10 is not above the permissible limit, the voltage across the whole of potentiometer 26 remains less than the bias voltage provided by potentiometer 16, and therefore transistor 15 remains non-conductive. The setting of potentiometer 16 thus predetermines the limit of steady current in line 10.

If the current in line 10 rises to a very high value, the voltage across the upper part of potentiometer 26 becomes alone sufficient to overcome the bias, and transistor 15 immediately becomes conductive to operate the relay and trip the circuit breaker. The setting of the tapping on potentiometer 26 predetermines the minimum value of current in line 10 which will thus cause immediate tripping of the circuit breaker.

For a range of intermediate values of excess current in line 10, the transistor 15 will become conductive after a period of charging of capacitor 28, when the difference between the voltage across the whole of potentiometer 26 and the voltage across resistor 27 has risen to a value sufficient to overcome the bias from potentiometer 16. This period of time lag becomes rapidly smaller as the line current and thus the input signal voltage across potentiometer 26 become greater. The decrease in the time lag period is more than proportionate to the decrease in the reciprocal of the input signal strength, so the characteristic is "very inverse."

This "very inverse" characteristic is due to the fact that the voltage applied to the time-constant network is only a part of the input signal voltage applied across the whole of potentiometer 26, from which input signal voltage it is subtracted in the input circuit of the amplifier.

A time-constant network consisting of an inductor and a resistor in series may obviously be used instead of the network 27, 28 consisting of a resistor and a capacitor. It is, however, difficult to obtain a sufficiently high time constant with an inductor.

The input resistance of a transistor is also a limitation on the time-constant which can be achieved, so other forms of amplifier having higher input resistance values may be substituted. For example a thermionic amplifier could be used, in spite of its other disadvantages; or alternatively the "technetron" which is just now becoming available.

What I claim as my invention and desire to secure by Letters Patent is:

1. An overload-protection circuit comprising
a transmission line connected between a source of alternating current and a variable load,
a circuit breaker in said transmission line tripping and isolating said load in response to an overload in excess of a predetermined magnitude,
a current transformer coupled to said line monitoring current flowing through said line,
a full-wave rectifier connected to said transformer rectifying said monitored current,
a resistance potentiometer connected across said rectifier developing a voltage corresponding to said monitored current,
a time constant network comprising a resistor connected in series with a reactive member from one end of said potentiometer to its tapping point,
an amplifier having an input circuit and an output circuit, said input circuit being connected across the other end of said potentiometer and the junction between said resistor and reactive member in said time constant network
means applying a voltage bias to said input circuit, and
circuit-breaker control means connected across the output circuit of said amplifier tripping said circuit breaker substantially instantaneously in the event of the monitored current being such that the voltage between said potentiometer tapping and the said other end thereof exceeds the bias on said amplifier, and after a time delay, in the event of the monitored current being such that the voltage across the one and other end of the potentiometer exceeds said bias, the time delay being dependent on the time taken for the voltage across the resistor in the time constant network to decay to a value at which the difference between this voltage value and the voltage across the one and other ends of the potentiometer exceeds said bias.

2. An overload protection circuit according to claim 1 comprising
a transactor interposed between said current transformer and said rectifier, said transactor having a primary winding connected across said current transformer and a secondary winding connected to said rectifier.

3. An overload protection circuit according to claim 1, wherein said reactive member is an inductor.

4. An overload protection circuit according to claim 1 wherein said reactive member is a capacitor.

5. An overload protection circuit comprising
a transmission line connected between a source of alternating current and a variable load,
a current transformer winding coupled to said line,
a transactor having primary and secondary windings, the primary winding being connected across said current transformer winding,
a bridge rectifier having a pair of input terminals and a pair of output terminals, the said secondary winding of the transactor being connected across the said pair of input terminals,
an amplifier having an input and an output,
a circuit breaker operatively connected to said amplifier output and connected in said transmission line to isolate said load in response to an overload exceeding a predetermined magnitude,
a voltage biasing means connected to said amplifier input,
a potentiometer connected across said rectifier output terminals, said potentiometer having a tapping dividing the potentiometer resistance into first and second resistance portions, the end of one resistance portion remote from said tapping being connected to one input terminal of said amplifier, and
a capacitor and a resistor connected in series across said second resistance portion, the junction between said capacitor and resistor being connected to another input terminal of said amplifier, the amplifier being rendered conductive either instantaneously if the voltage developed across said first resistance portion exceeds the bias on the amplifier input or after a time delay, dependent on the charging rate of the capacitor, when the sum of the voltages developed across the first resistance portion and said capacitor exceeds said bias.

6. An overload protection circuit according to claim 5, wherein said amplifier comprises a transistor, said voltage biasing means comprising a potentiometer having a tapping connected to the emitter terminal of said transistor, a D.C. voltage source being connected across said potentiometer.

References Cited by the Examiner
UNITED STATES PATENTS
2,977,510   3/61   Adamson _____ 317—36

SAMUEL BERNSTEIN, *Primary Examiner.*
LLOYD McCOLLUM, *Examiner.*